United States Patent [19]

Miyata et al.

[11] Patent Number: 4,869,706
[45] Date of Patent: Sep. 26, 1989

[54] SPEED-SHIFTING DEVICE

[75] Inventors: Hirofumi Miyata; Katsushiro Kuchisubo; Chikara Sakamoto, all of Kobe, Japan

[73] Assignee: Bando Chemical Industries, Ltd., Kobe, Japan

[21] Appl. No.: 330,966

[22] Filed: Mar. 30, 1989

Related U.S. Application Data

[63] Continuation of Ser. No. 162,243, Feb. 29, 1989, abandoned.

[30] Foreign Application Priority Data

Feb. 28, 1987 [JP] Japan .................................. 62-45980
Aug. 3, 1987 [JP] Japan .................................. 62-194110

[51] Int. Cl.[4] ............................................ F16H 55/52
[52] U.S. Cl. ........................................ 474/8; 474/70; 474/135
[58] Field of Search ............... 474/101, 109, 111, 133, 474/135, 8, 10–12, 17, 19, 69, 70; 74/689; 56/11.1, 11.6

[56] References Cited

U.S. PATENT DOCUMENTS

| 3,762,229 | 10/1973 | Johnson | 474/135 X |
| 4,327,544 | 5/1982 | McDuffie et al. | 56/11.1 X |
| 4,400,930 | 8/1983 | Huhman et al. | 474/70 X |

FOREIGN PATENT DOCUMENTS

| 1191477 | 10/1989 | France . |
| 60-184759 | 9/1985 | Japan . |
| 2177169A | 1/1987 | United Kingdom . |

*Primary Examiner*—Thuy M. Bui
*Attorney, Agent, or Firm*—Wenderoth, Lind & Ponack

[57] ABSTRACT

In a speed-shifting device of a variable speed pulley type, a transmission ratio is changed by an inversely synchronized operation between a movable sideplate of the driving and driven pulleys. The tension is given to a belt by a bias mechanism biasing the slack part. In addition, the bias mechanism can be arranged to be movable for decreasing the tension of the belt to serve as a clutch mechanism interrupting the power transmission between the pulleys.

5 Claims, 9 Drawing Sheets

SPEED-SHIFTING DEVICE

This application is a continuation of now abandoned application Ser. No. 162,243 filed Feb. 29, 1989, now abandoned.

BACKGROUND OF THE INVENTION

1. Field of the Invention

This invention relates to an improvement of a speed-shifting device including variable speed pulleys to change a transmission ratio of a pair of transmission shafts by varying the effective radius of the pulleys for a belt member.

2. Description of the Prior Art

In agricultural implements and the like, many transmission type speed-shifting devices have been used which have a belt drive for transmitting the power of an engine to a driven wheel or an operating device which requires changing speed. As a belt transmission type speed-shifting device utilizing a belt drive, a variable speed type device is well known, for example, comprising a pair of parallel transmission shafts, variable speed pulleys composed of fixed sideplates fixedly rotatably and axially non-slidably mounted on each transmission shaft forming a V-shaped groove with the fixed sideplates facing thereto, and a belt member trained in the V-shaped grooves between the respective pairs of sideplates, wherein the transmission ratio between the two transmission shafts is adjusted by changing the effective radius of the pulleys by moving axially the movable sideplates of each variable pully toward and away from the fixed sideplates.

In such a speed-shifting device, generally a variable speed pulley on one of the transmission shafts is a driving pulley, the movable plate of which is axially moved by a driving mechanism utilizing, for example, hydraulic equipment or a cam mechanism, to change the effective radius of the driving pulley, and the variable speed pulley on the other transmission shaft is a driven pulley, the effective radius thereof adjusted in dependence on the movement of the belt member by change of the effective radius of the driving pulley under the bias of a spring urging the movable sideplate toward the fixed sideplate.

However, there occur various problems as described below resulting from the high bias force on the movable sideplate in the driven pulley. Namely:

(1) Since the tension of the belt member trained between the two pulleys is substantially set by the spring adapted to urge the movable sideplate of the driven pulley toward the fixed sideplate, it is necessary to increase the bias force on the movable sideplate by increasing the force of the spring in order to ensure the power delivery between the transmission shafts. Since the cost of the high force spring is high, there is the problem of an increase in the total cost. In addition to this problem, when assembling a speed-shifting device, setting the spring thereinto is not easily done.

(2) Also, since the speed-shifting process is such that when the effective radius of said driving pulley is changed by the movement of the movable sideplate, the belt member moves in accordance therewith, with the result that the change of the effective radius of the driven pulley is varied and the transmission ratio between the transmission shafts varies thereafter, so that a certain period of time is required for shifting the speed. Particularly, when the transmission ratio is shifted from a low speed mode to a high speed mode, a high handling force is required to move the movable sideplate of the driven pulley away from the fixed sideplate against the bias of the spring. As a result, it is hard to shift the transmission ratio between the transmission shafts quickly and smoothly with a small handling force.

(3) Moreover, as shown in FIG. 9, when the driving mode changes from the unloaded mode, in which no driving power is transmitted between the transmission shafts (a) and (b), into the load mode in which a certain driving power is transmitted, the pitch line of the belt member (c) located at the position shown in full lines in this figure in the unloaded mode of the driven pulley (d) moves to a middle position thereof shown in a broken line by an inner thrust of the belt member (c). Nevertheless, in the driven pulley (e) the movable sideplate (e1) is urged by the spring. Therefore, its pitch line moves radially outwardly attended with an elongation of the whole belt member (c) and a decrease in the effective radius due to the inner thrust of the belt member (c) in said driving pulley (d), resulting in a certain decrease in rotational speed at the output transmission shaft.

In order to solve the abovementioned problem, the objects of this invention are to reduce the force of the spring for giving a tension to the belt member, to smooth the speed shifting operation by making it such as to require only a slight handling force, and to prevent decrease in the rotational speed of the driven shaft caused by the elongation of the belt member during the shifting of the drive mode from the unloaded to the loaded mode by providing a means for moving the movable sideplates of both pulleys synchronously and by giving the tension to the belt member by other means than the bias of the movable sideplate toward the fixed sideplate of the driven pulley.

SUMMARY OF THE INVENTION

In order to attain these objects, the speed-shifting device of this invention is provided with a mechanism for axially moving the movable sideplates of both pulleys inversely toward and away from the fixed sideplates facing thereto, and a means for giving tension to the belt member trained to both pulleys by biasing a slack part thereof.

Concretely, as mentioned above, this invention is constituted by a speed-shifting device comprising a pair of parallel transmission shafts, a driving pulley and a driven pulley each of which is composed of a fixed sideplate fixedly rotatably and axially non-slidably mounted on the corresponding transmission shaft, and a movable sideplate axially slidably and fixedly rotatably mounted on the corresponding transmission shaft and forming a V-shaped groove with the fixed sideplate, and a belt member trained between said pulleys engaging both the V-shaped grooves thereof, arranged so that the transmission ratio between the transmission shafts can be changed by varying the effective radius of the engagement of each pulley with the belt member by moving each movable sideplate axially toward and away from a fixed sideplate facing thereto.

In the speed-shifting device, a speed-shifting mechanism is provided to change the transmission ratio between the transmission shafts by operating each movable sideplate of the pulleys so as to move the movable sideplate away from the fixed sideplate on one transmission shaft when the movable sideplate on the other transmission shaft is moved toward the fixed sideplate.

Also, a bias mechanism is provided between the pulleys, adapted for biasing a slack part of the belt member to increase the tension thereof.

A specific example of the speed-shifting mechanism comprises a cam mechanism adapted to move the movable sideplate of the driving pulley axially toward and away from the fixed sideplate, a cam mechanism adapted to move the movable sideplate of the driven pulley axially toward and away from the fixed sideplate, and a connecting mechanism including wires, linkages or the like for connecting the cam mechanisms, arranged so that when the movable sideplate of one pulley moves axially toward the fixed sideplate, the movable sideplate of the other pulley simultaneously moves axially away from the fixed sideplate.

Also, in this case, each cam mechanism is composed of a driving cam and a driven cam contacted therewith, and more preferably, a cam roller is substituted for either the driving cam or the driven cam in order to reduce the handling force by a decrease in the frictional resistance while shifting the speed.

DESCRIPTION OF THE PREFERRED EMBODIMENTS

Embodiments as the best mode for carrying out this invention are described below, with reference to the drawings.

Figure 1:
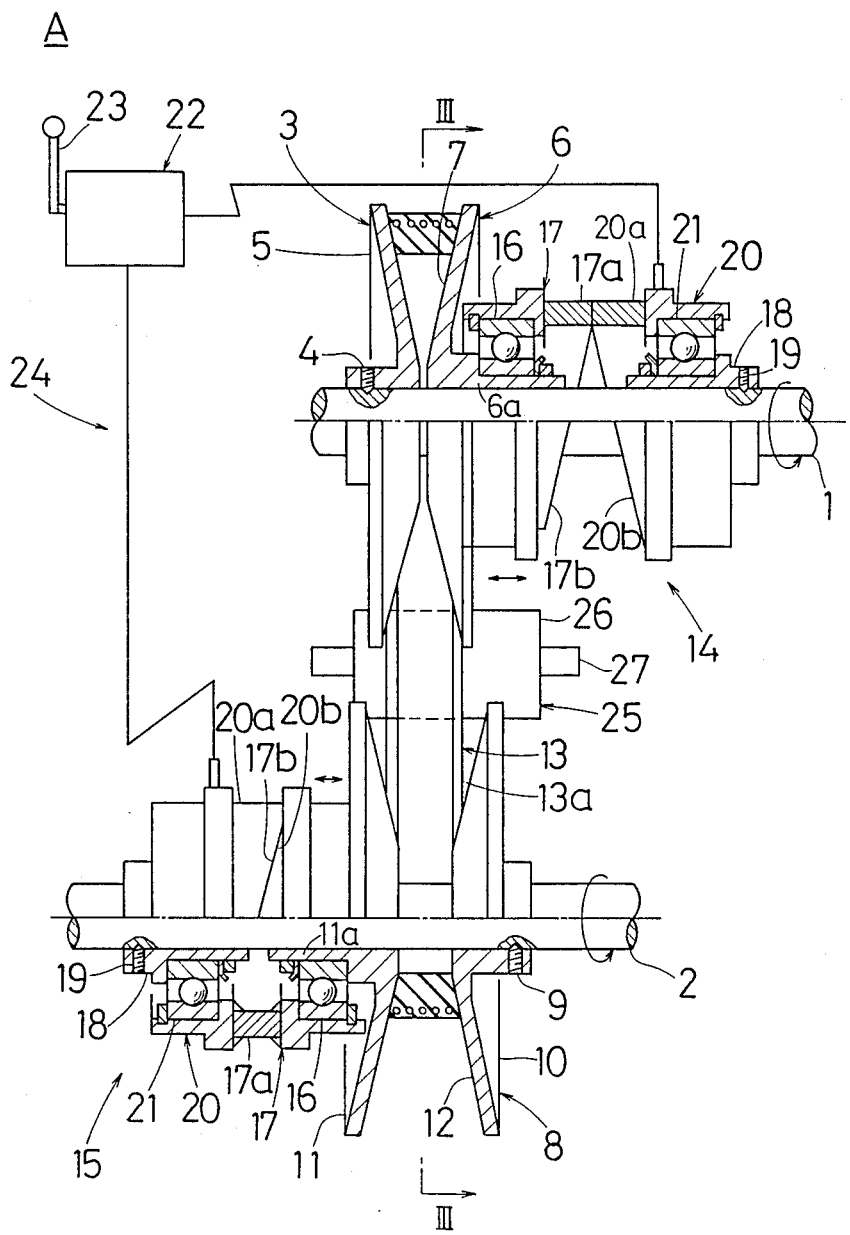
FIG. 1 is an elevation partly in section of a speed-shifting device according to the present invention in the high speed mode.
Figure 2:
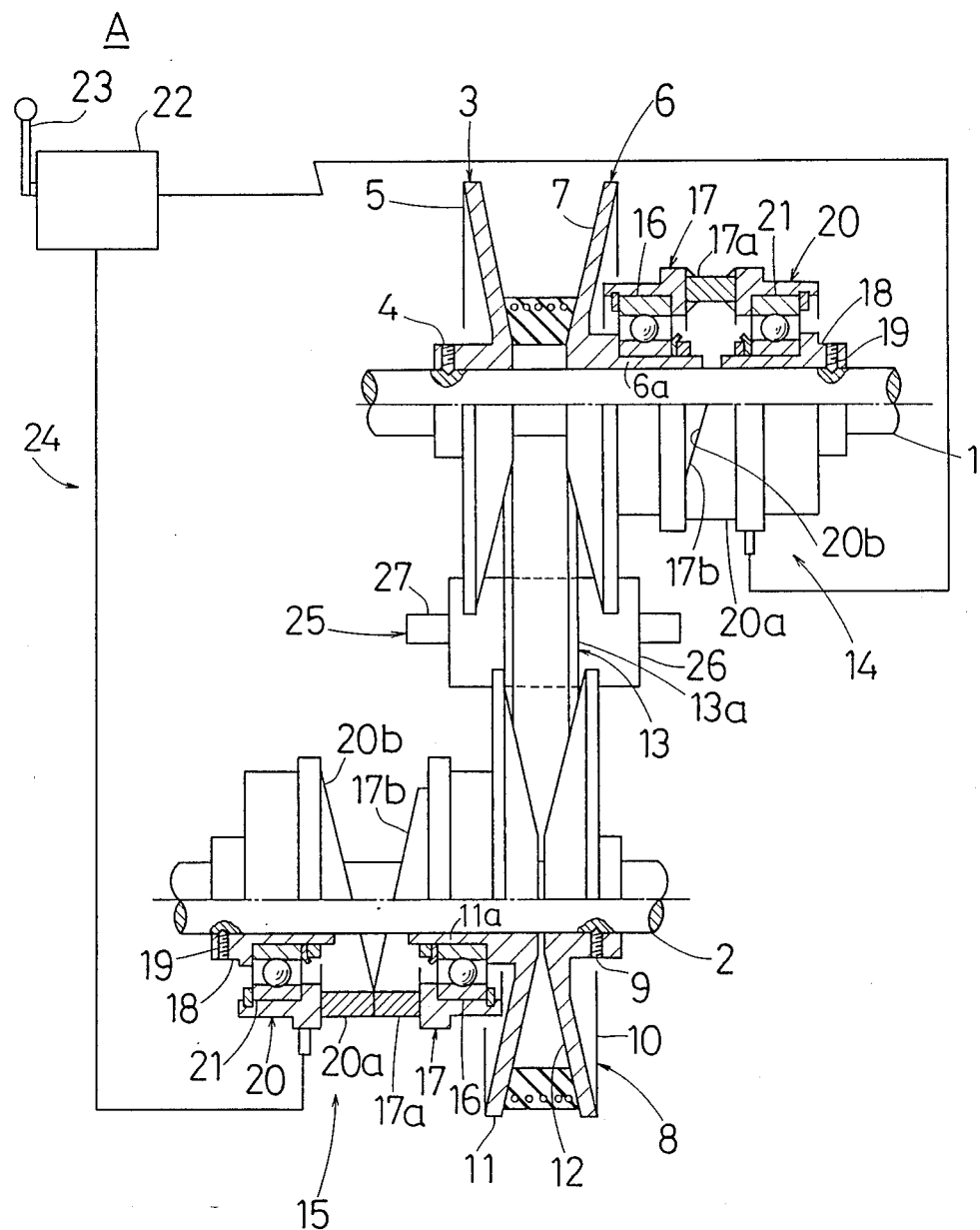
FIG. 2 is a view similar to FIG. 1 with the speed-shifting device in the low speed mode.

FIG. 1 and 2 show arrangements of a pulley type speed-shifting device (A) according to this invention, wherein an input shaft 1 serving as a transmission shaft and an output shaft 2 serving as the other transmission shaft are parallel. A driving pulley 3 is mounted on said input shaft 1. This driving pulley 3 is composed of a flange shaped fixed sideplate 5 fixedly rotatably and axially non-slidably mounted on the input shaft 1 by a screw 4 and a flange shaped movable sideplate 6 axially slidably and fixedly rotatably mounted on a spline in the input shaft 1 at a boss part 6a so as to face said fixed sideplate 5. A V-shaped belt groove 7 is formed between the sideplates 5 and 6.

On the other hand, a driven pulley 8 is mounted on the output shaft 2. This driven pulley 8 is the same as the driving pulley 3, being composed of a flange shaped fixed sideplate 10 fixedly rotatably and axially non-slidably mounted on the output shaft 2 by a screw 9 and a flange shaped movable sideplate 11 axially slidably and fixedly rotatably mounted by a spline on the output shaft 2 at a boss part 1a so as to face the fixed sideplate 10 from the opposite direction so that the movable sideplace 6 faces the fixed sideplate 5 in the driving pulley 3 on the input shaft 1. A V-shaped groove 12 is also formed between these sideplates 10 and 11. A V-belt 13 is trained between pulleys 3 and 8, engaging the two V-shaped grooves 7 and 12 thereof. The effective radius of the engagement of each pulley 3 and 8 with the V-belt 13 is adjusted by moving each movable sideplate 6 ad 11 axially of the respective pulleys 3 and 8 toward and away from the fixed sideplates 5 and 10. When the movable sideplate 6 of the driving pulley 3 is moved toward the fixed sideplate 5 and the movable sideplate 11 of the driven pulley 8 is moved away from the fixed sideplate 10, the effective radius of the driving pulley 3 is increased and the effective radius of the driven pulley 8 is decreased. As a result, the transmission ratio beteen the input shaft 1 and the output shaft 2 is increased. On the contrary, when the movable sideplate 6 of the driving pulley 3 is moved away from the fixed sideplate 5 and the movable sideplate 11 of the driven pulley 8 is moved toward the fixed sideplate 10, the effectve radius of the driving pulley 3 is decreased and the effective radius of the driven pulley 8 is increased. As a result, the transmission ratio between the input shaft 1 and the output shaft 2 is decreased.

On the input shaft 1 and the output shaft 2 are mounted cam mechanisms 14 and 15 coaxially to both pulleys 3 and 8, adapted to move the corresponding movable sideplate 6 and 11 axially toward or away from the opposed fixed sideplate 5 or 10. Since each cam mechanism 14 and 15 is the same, only the cam mechanism 14 of the input shaft 1 is explained below, and an explanation of the cam mechanism 15 is omitted. Namely, the cam mechanism 14 comprises a cylindrical driven cam 17 fixedly rotatably and axially non-slidably mounted on an outer race of a ball bearing 16 whose inner race is mounted on a boss part 6a of the movable sideplate 6. On the input shaft 1 on the opposite side of the fixed sideplate 5 from the movable sideplate 6, a cylindrical sleeve 18 is mounted fixedly rotatably and axially non-slidably by a screw 19. A cylindrical driving cam 20 is mounted rotatably and axially non-slidably on an outer race of a ball bearing 21 whose inner race is mounted on said sleeve 18. The driving and driven cams 20 and 17 are provided with cam parts 20a 17a projecting toward each other. These cam parts 20a and 17a are nearly the same shape, having oblique section when a cylinder is cut diagonally. At the ends of each cam part 20a and 17a inclined cam faces 20b and 17b are formed contacting in cam engagement with each other, and the arrangement is such that on turning of the driving cam 20 around the input shaft 1, the driven cam 17 is moved with the movable sideplate 6 of the driving pulley 3 axially toward the fixed sideplate 5 along the input shaft 1 for increasing the effective radius of the driving pulley 3 for the V-belt 13.

In each cam mechanism 14 and 15, the driving cams and driven cams 20 and 17 are connected with a shifting lever 23 by a connecting mechanism 22 including linkages, wires or the like to rotate them in accordance with the shifting lever 23. Namely, a speed-shifting mechanism 24 is so arranged as to vary the transmission ratio between the shafts 1 and 2 by operating each movable sideplate 6 and 11 of respective pulleys 3 and 8 in a manner such that when the movable sideplate 6 or 11 is moved toward the confronting fixed sideplate 5 or 10, the other movable sideplate 11 or 6 is moved away from the fixed sideplate 10 or 5.

Figure 3:
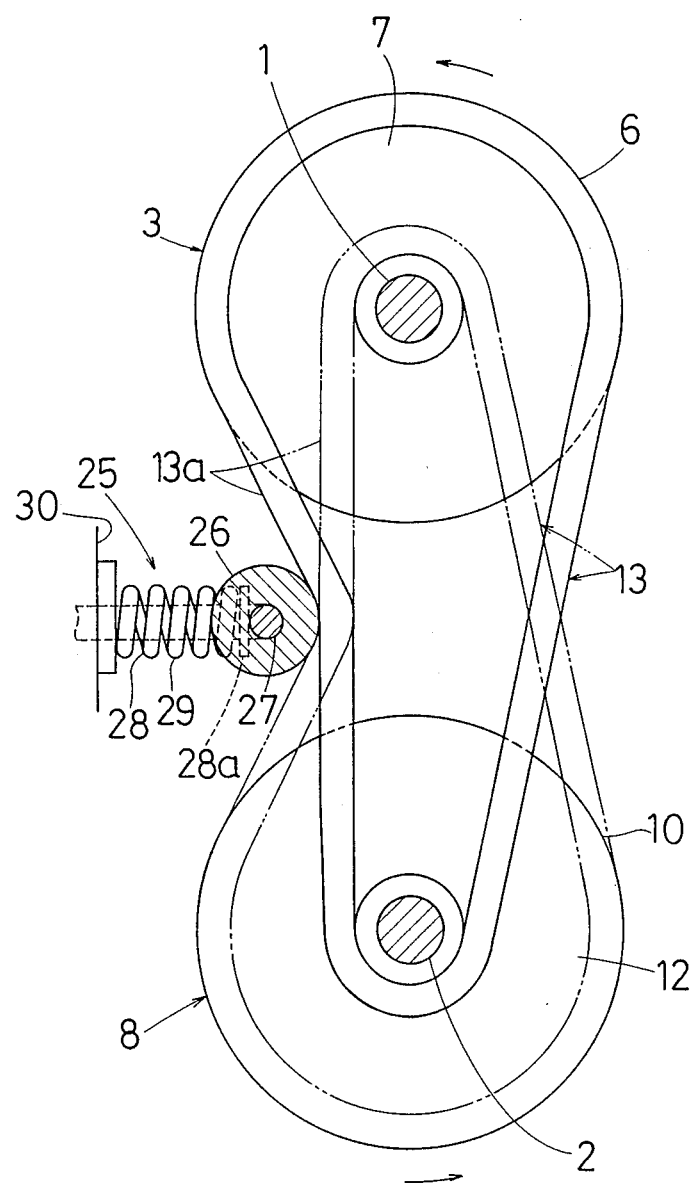
FIG. 3 is a cross-sectional view on line III—III in FIG. 1.

Moreover, between pulleys 3 and 8 is a bias mechanism 25 adapted to bias a slack part 13a of the V-belt 13 (the part moving from the driving pulley to the driven pulley) from the outside for increasing the tension of the V-belt 13. One embodiment of this bias mechanism 25, as shown in FIG. 3, comprises a cylindrical tension roller 26 contacting the V-belt at the outer circumferential surface (back side) in the slack part 13a, a supporting shaft 27 parallel with the shafts 1 and 2 axially rotatably supporting the tension roller 26, a pair of rods 28 and 28 (only one of them is shown) fixedly mounted on both ends of the supporting shaft 27 movably supporting the tension roller 26 for movement in a direction crossing at nearly a right angle to the belt through the shafts 1 and 2 on a retaining member 30, and springs 29 mounted on each rod 28 being compressed between the spring holders 28a and said retaining member 30 and biasing the roller 26 and the supporting shaft 27 in the direction in which the tension of the V-belt 13 is increased. Namely, the bias mechanism 25 is arranged so that the tension is given to the V-belt 13 by urging the tension roller 26 against the outer circumferential surface of the V-belt 13 with the force of each spring 29. The tension roller 26 is axially long enough to keep contact with the outer circumferential surface of the V-belt 13 which fluctuates parallelly with shafts 1 and 2.

The operation of the speed-shifting device is explained below.

The movable sideplates 6 and 11 of pulleys 3 and 8 and the sleeves 18 are rotated with the respective shafts 1 and 2. Each driven cam 17 on the boss parts 6a and 11a of the movable sideplates 6 and 11 and the driving cams 20 on the sleeves 18 are held without rotating on the shafts 1 and 2.

When the transmission ratio of the input 1 to the output shaft 2 is increased to change into the high speed mode, the FIG. 2 condition, the position of the shifting lever 23 in the speed-shifting mechanism 24 is shifted to the high speed position. Following this shifting operation of the shifting lever 23, as shown in FIG. 1, the driving cam 20 of the cam mechanism 14 on the input shaft 1 is turned around the input shaft 1 in one direction (for example, clockwise). By this turn of the driving cam 20, the driven cam 17, due to the contacting inclined cam faces 20b and 17b of the cam parts 20a and 17a, is forced to move away from the driving cam 20 (in the left direction in the figure) on the input shaft 1, the movable sideplate 6 of the driving pulley 3 connected with this driven cam 17 via the ball bearing 16 is moved in the same direction toward the fixed sideplate 5. As a result, the width of the belt groove 7 of the driving pulley 3 is decreased, resulting in the increase in effective radius thereof for the V-belt 13. Also, inversely synchronized with the movement of the driving pulley 3, the driving cam 20 in the cam mechanism 15 on the output shaft 2 is turned around the output shaft 2 in one direction by the shifting operation by the shifting lever 23. By this turn of the driving cam 20, the driven cam 17 is released from the bias and urged by the tension of the V-belt to move on the output shaft 2 in the direction to approach the driving cam 20 (in the left direction in the Figure), and the movable sideplate 11 of the driven pulley 8 is moved in the same direction to move away from the fixed sideplate in accordance with the movement of the driven cam 17, with the result that the effective radius of the driving pulley 3 and the V-belt 13 is decreased. As a whole, the effective radius of the driving pulley 3 is shifted so as to be larger than that of the driven pulley 8, and rotation of the input shaft 1 is transmitted to the output shaft 2 with increased speed.

On the other hand, when the transmission ratio between shafts 1 and 2 is to be lowered to change into the low speed mode, the position of shifting lever 23 is shifted to the low speed position. Following the shifting operation by the shifting lever 23, as shown in FIG. 2, the driven cam 20 in the cam mechanism 14 on the input shift 1 is turned around the input shaft 1 in the other direction (counterclockwise). By this turn of the driving cam 20 the driven cam 17 is released from the bias and urged by the tension of the V-belt 13 to move the driven cam 17 on the input shaft 1 in a direction to approach the driving cam 20 (to the right in the figure), and the movable sideplate 6 of the driving pulley 3 is moved toward the fixed sideplate 5 in the same direction, resulting in a decrease of the effective radius thereof for the V-belt 13. Also, on the output shaft 2, the driving cam 20 in the driven cam 17 is urged to move on the output shaft 2 away from the driving cam 20 (in the right direction in the figure), and the movable sideplate 11 of the driven pulley 8 is moved in the same direction to approach the fixed sideplate 10, resulting in an increase of the effective radius of the driven pulley 8 for the V-belt 13. As a whole, the effective radius of the driving pulley 3 is shifted to be smaller than that of the driven pulley 8 and rotation of the input shaft 1 is transmitted to the output shaft 2 with decreased speed.

The outer circumferential surface of the slack part 13a of the V-belt 13 is biased to the inside by the tension roller 26 of the bias mechanism 25 between pulleys 3 and 8. A predetermined tension is given to the V-belt 13 by the bias of the roller 26.

In this case, therefore, since the V-belt 13 is given a tension by being biased on the outer circumferential surface of the slack part 13a of the V-belt 13 by the roller 26 of the bias mechanism 25, the force of each spring 29 for giving the tension to the V-belt 13 can be reduced, the cost can be lowered, and it is easy to set up the springs 29 and total assembling workability can be improved.

Furthermore, since the movable sideplates 6 and 11 of the pulleys are mechanically driven to move axially by the speed-shifting mechanism 24, such a high handling force as in the conventional device for moving the movable sideplate 11 against the bias of the spring is not needed when shifting the speed. In addition, the action of shifting speed becomes quick due to the synchronous movement of the movable sideplates 6 and 11 of pulleys 3 and 8, and therefore the speed shifting operation between shafts 1 and 2 can be done smoothly with little handling force. For example, in test results, to transmit the power of 7 HP between the shafts, about 100 Kg/f of the bias force (axial force) is required by springs in the case of the conventional device, but it only required abouat 10 Kg/f in the case of the present invention. The force of springs can be reduced to about one-tenth of the springs of the conventional device.

Figure 4:
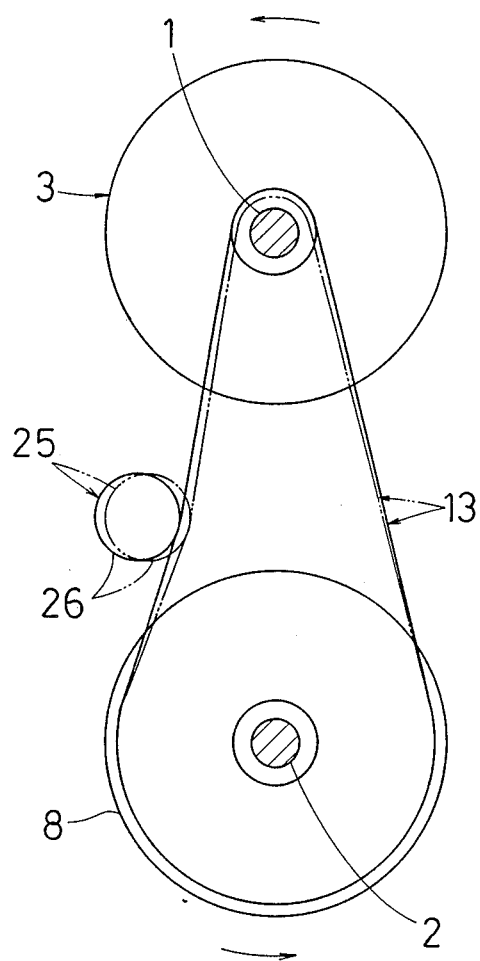
FIG. 4 is a schematic sectional view showing the movement of the pitch line of the belt member while the driving mode changes from the unloaded to the loaded mode.

Moreover, while the movement from the unloaded mode in which the power is not transmitted between shafts 1 and 2 to the loaded mode in which the power is transmitted, as shown in FIG. 4, in the driving pulley 3 in the conventional device, the pitch line of the V-belt 13 is moved inwardly by the inner thrust of the V-belt, causing an elongation of the V-belt 13. However, in this invention, the elongation of the V-belt is prevented by the bias mechanism 25, since the tension of the V-belt 13 is provided by the bias mechanism 25. Therefore, since the pitch line in the driven pulley 8 is not moved radially outwardly as observed in the conventional device, decrease of the rotational speed of the output shaft 2 can be reduced effectively.

Figure 5:
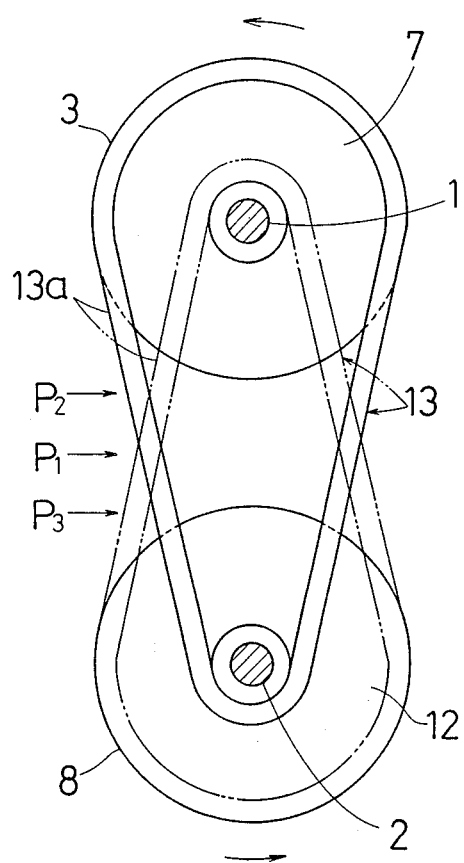
FIG. 5 is a schematic sectional view showing several examples of the position of the action bias mechanism.

Furthermore, the position of the bias mchanism 25 placed between pulleys 3 and 8 can be selected, for example, to be any one of a first position (P1) to a third position (P3), as shown in FIG. 5. The first position (P1) is located in nearly the middle of the space between pulleys 3 and 8 where the movement of the V-belt 13 is the least during the shifting of the transmission ratio of the input shaft 1 to the output shaft 2. The second position (P2) and the third position (P3) are offset toward the input shaft 1 or the output shaft 2, respectively, from said first position (P1).

When the bias mechaism 25 is placed at the first position (P1), the tension of the V-belt 13 can always be kept nearly constant. When it is placed at the second position (P2), the force for biasing the tension roller 26 toward the V-belt 13 is raised to increase the tension of the V-belt when the transmission ratio is shifted into the high load mode (the location of the V-belt at that time is shown in full lines), and the bias force on the V-belt is lowered to decrease the tension of the V-belt 13 in the low load mode. On the other hand, when it is placed at the third position (P3), a reverse characteristic of tension variation occurs from that when it is placed at the second position (P2). Therefore, when the condition for using the speed-shifting device (A) or the transmission ratio of high frequency is changed, the tension of the V-belt 13 can be quickly adjusted by moving the position of the bias mechanism 25 to the optimum position in dependence with its change.

Figure 6:
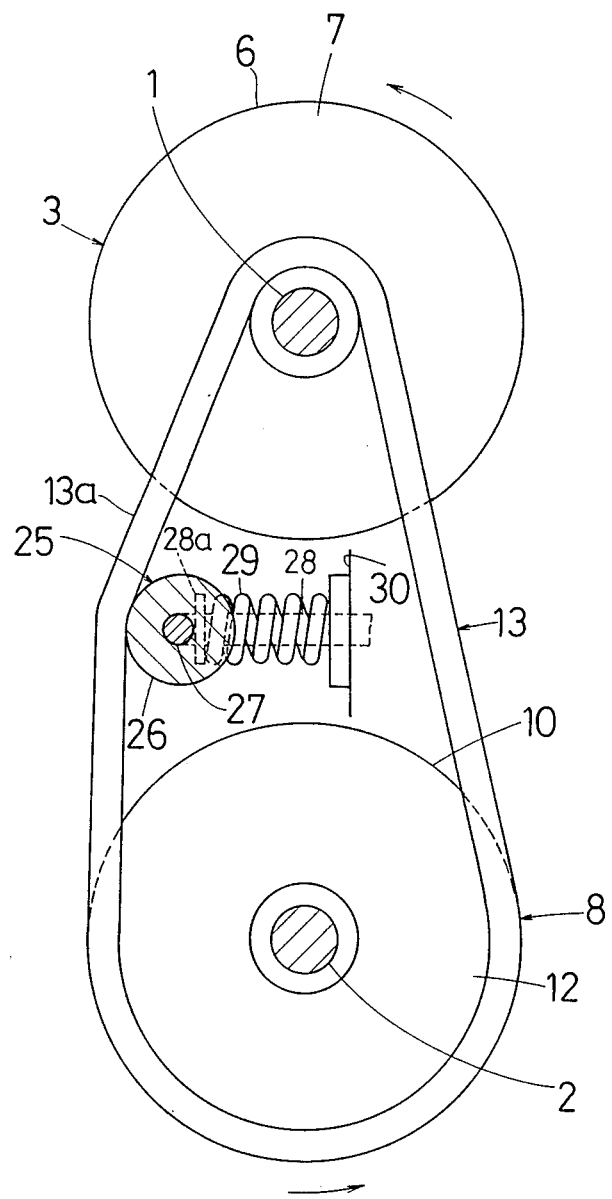
FIG. 6 is a schematic sectional view showing an embodiment having a bias mechanism mounted inside of the pitch line.
Figure 7:
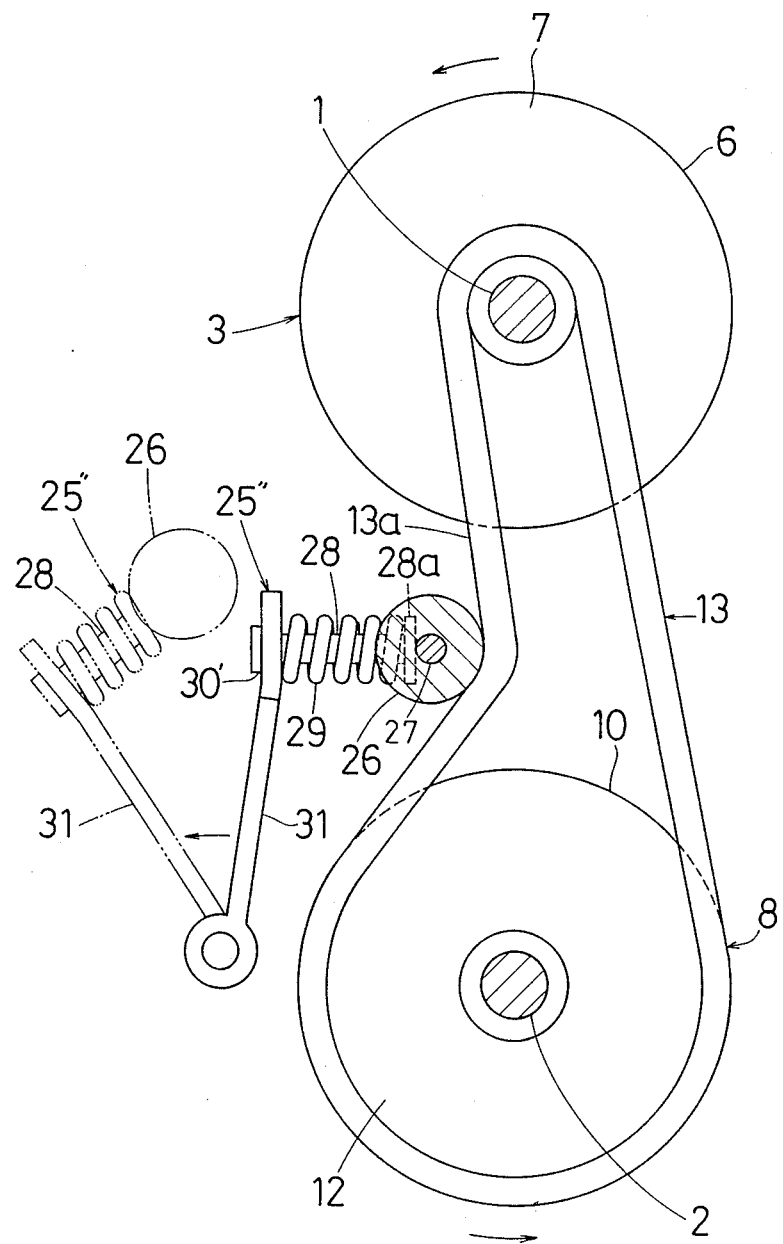
FIG. 7 is a schematic section view showing an embodiment where a bias mechanism also serves as a clutch mechanism.
Figure 8:
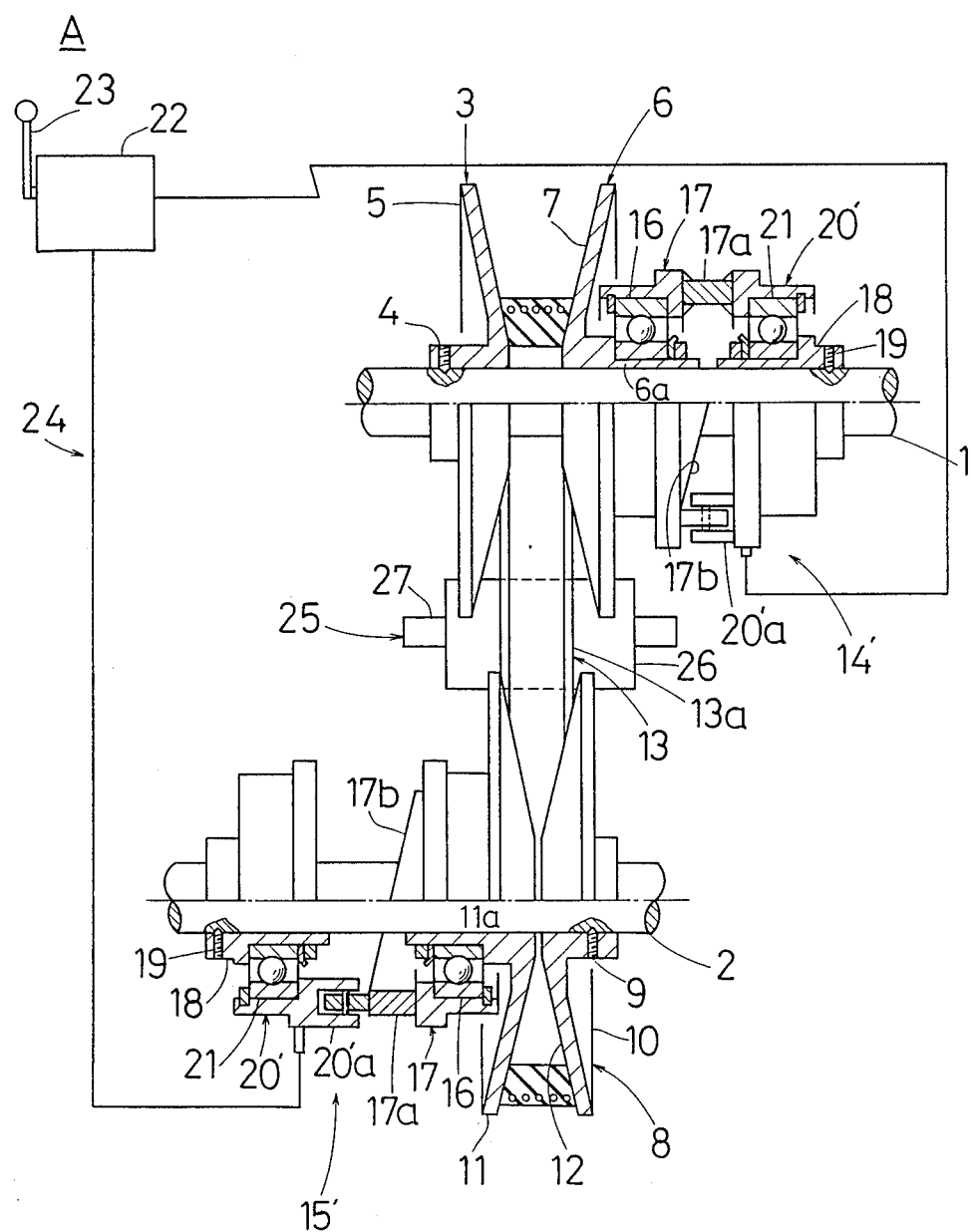
FIG. 8 is a view similar to FIG. 1 showing another embodiment of a speed-shifting device according to the present invention.
Figure 9:
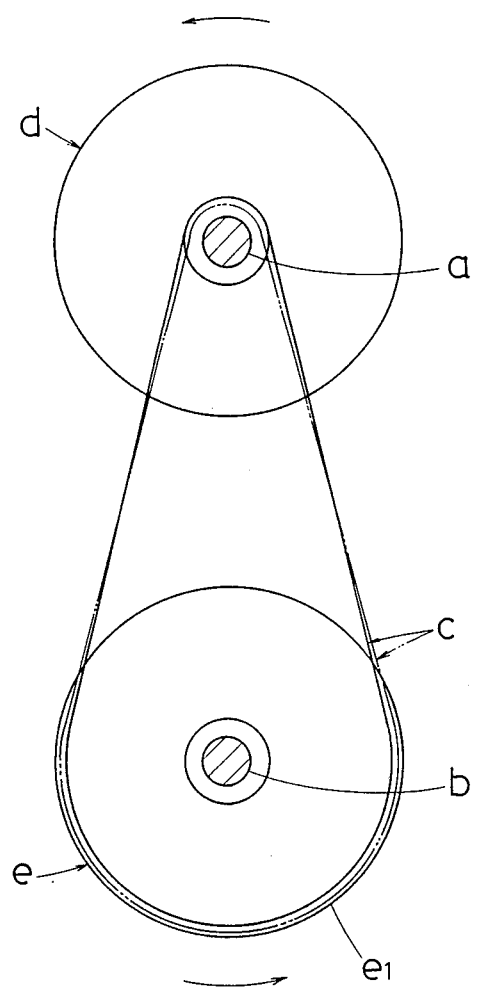
FIG. 9 is a schematic section view showing the movement of the pitch line of the belt in a conventional device.

Other embodiments of this invention are shown in FIGS. 6–8. In FIGS. 6 to 8, detailed explanations of the same portions equivalent to the above-described embodiment are omitted, but the parts are given the same reference numerals.

In the embodiment as shown in FIG. 6, a bias mechanism 25 for giving the tension to the V-belt 13 is placed inside of the pitch line. The same effects as in the above described embodiment are obtained with this embodiment.

In the embodiment as shown in FIG. 7, a bias mechanism 25" is movably arranged to lower the tension of the V-belt 13 by providihg a retaining member 30' for retaining the tension roller 26 on the end of a turn arm 31. As a resut, the bias mechanism 25" can also serve as a clutch mechanism to stop the power transmission between shafts 1 and 2 in correspondence with a lowering of the tension of the V-belt 13.

In this embodiment, the power transmission between shafts 1 and 2 can be interrupted by turning turn arm 31, in addition to the same working effect as obtained in the above described embodiment. Further, since interruption and operation of the power transmission can be done independently of the transmission ratio of the input shaft 1 to the output shaft 2, interruption of the power transmission can be done immediately whenever required and the transmission ratio when the power transmission is resumed can be kept equal to the one before the interruption. In consequence, there is an advantage that the previous transmission ratio can be obtained quickly after the clutch mechanism has stopped working, which cannot be obtained in a clutch mechanism arranged so that the power transmission is interrupted by moving the movable sideplate of the pulley to a remote position from the fixed sideplate.

Furthermore, FIG. 8 shows an embodiment wherein the arrangement of the cam mechanisms 14 and 15 is altered. Namely, in this embodiment, in each driving cam 20' of cam mechanisms 14' and 15', one roller follower 20'a which rotates in contact with the inclined cam face 17b at the end of the cylindrical cam part 17a in the driven cam 17 is mounted at a predetermined peripheral position replacing the cam part 20a in the above described example.

In this arrangement, while changing speed by a shifting operation with the shifting lever 23, when the driving cam 20 is turned, the roller follower 20'a is urged toward the cam face 17b, rotating along the inclined cam face 17b formed at the end of the cylindrical cam part 17a in the driven cam 17. As a result, the frictional resistance between the driving cam 20' and driven cam 17' is greatly reduced, so there is the advantage that the handling force for shifting speed can be greatly reduced. In addition, in this case, the roller followers 20'a can be replaced by any cam follower, a roller bearing, or the like. Also, the roller follower 20'a may be provided in the driven cam 17 instead of the driving cam 20'.

Although in each of the above described embodiments, the movable sideplates 6 and 11 of pulleys 3 and 8 on shafts 1 and 2 are moved axially by the cam mechanisms 14 and 15 composed of the driving cams 20 and the driven cams 17, the movable sideplates 6 and 11 can be moved by other mechanisms, for example, screw members axially moved by relative turns of the input shaft 1 and output shaft 2.

We claim:

1. In a speed shifting device having a pair of parallel transmission shafts, a driving pulley on one shaft and a driven pulley on the other shaft, each pulley being composed of a fixed sideplate fixedly rotatably and axially non-slidably mounted on the corresponding transmission shaft and a movable sideplate axially slidably and fixedly rotatably mounted on the corresponding transmission shaft in spaced opposed relationship to the corresponding fixed sideplate and defining a V-shaped groove between the sideplates, and a belt member trained between said driving pulley and said driven pulley engaging in the respective V-shaped grooves thereof for causing the transmission ratio between the transmission shafts to be changed when the effective radius of the engagement of each said pulley with the belt member is varied by moving the movable sideplate of each pulley axially of the corresponding transmission shaft toward and away from the fixed sideplate, the improvement comprising:
   a speed shifting mechanism for changing the transmission ratio between said transmission shafts by moving the respective movable sideplates of said driving pulley and said driven pulley, said speed shifting mechansim comprising:
   a first cam mechanism operatively associated with said movable sideplate of said driving pulley for moving said movable sideplate axially of the corresponding transmission shaft toward and away from the fixed sideplate of said driving pulley;

a second cam mechanism operatively associated with said movable sideplate of said driven pulley for moving said movable sideplate axially of the corresponding transmission shaft toward and away from the fixed sideplate of said driven pulley; and a connecting mechanism connecting said first cam mechanism with said second cam mechanism for synchronizing the operation of said cam mechanisms for, when the movable sideplate of one pulley moves axially of the corresponding transmission shaft toward the fixed sideplate thereof, causing the movable sideplate of the other pulley to move simultaneously axially of the corresponding transmission shaft away from the fixed sideplate thereof, and vice versa.

2. The speed-shifting device of claim 1 wherein said connecting mechanism comprises wires connecting said first cam mechanism with said second cam mechanism.

3. The speed-shifting device of claim 1 wherein said connecting mechanaism comprises linkages connecting said first cam mechanism with said second cam mechanism.

4. The speed-shifting device of claim 1 wherein said cam mechanisms are each composed of a driving cam and a driven cam contacted therewith.

5. The speed-shifting device of claim 1 wherein said cam mechanisms are each composed of a cam and a roller follower contacted therewith.

* * * * *

UNITED STATES PATENT AND TRADEMARK OFFICE
CERTIFICATE OF CORRECTION

PATENT NO. : 4,869,706

DATED : September 26, 1989

INVENTOR(S) : Hirofumi MIYATA et al.

It is certified that error appears in the above-identified patent and that said Letters Patent is hereby corrected as shown below:

In the heading, line [63], for "February 29, 1989", read
--February 29, 1988--.

Signed and Sealed this

Thirty-first Day of July, 1990

Attest:

HARRY F. MANBECK, JR.

*Attesting Officer*  *Commissioner of Patents and Trademarks*